July 5, 1927.
S. W. ELSTONE
1,634,655
WASH-OUT PLUG AND METHOD OF MAKING SAME
Filed Jan. 22, 1925   2 Sheets-Sheet 1
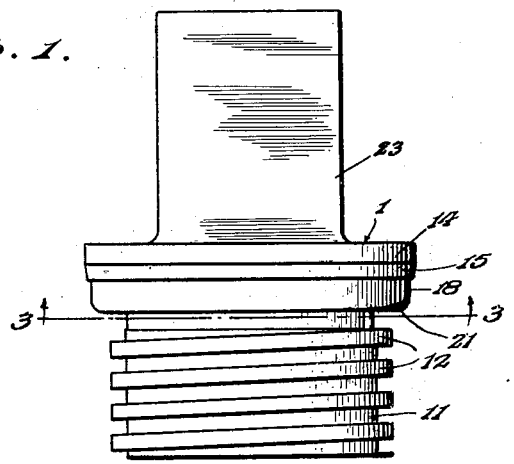
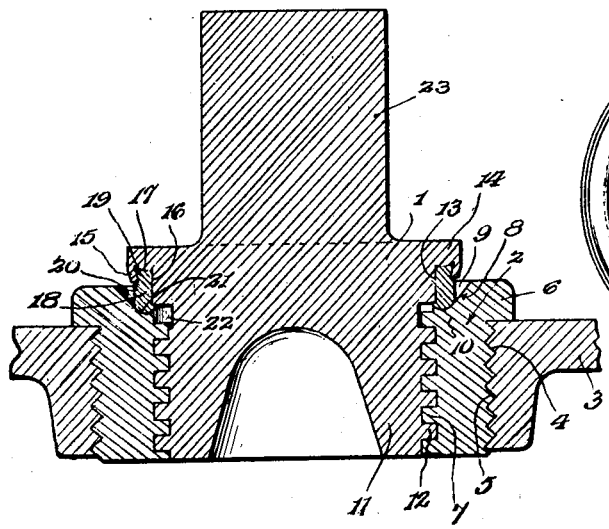
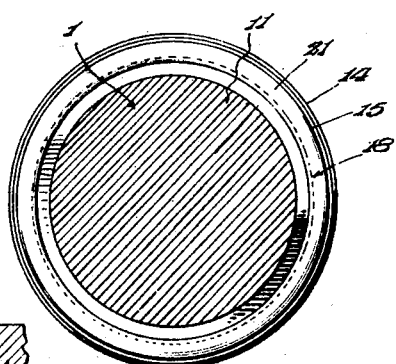
Inventor
Stanley W. Elstone.
By
Lacey & Lacey, Attorneys July 5, 1927.
S. W. ELSTONE
1,634,655
WASH-OUT PLUG AND METHOD OF MAKING SAME
Filed Jan. 22, 1925  2 Sheets-Sheet 2
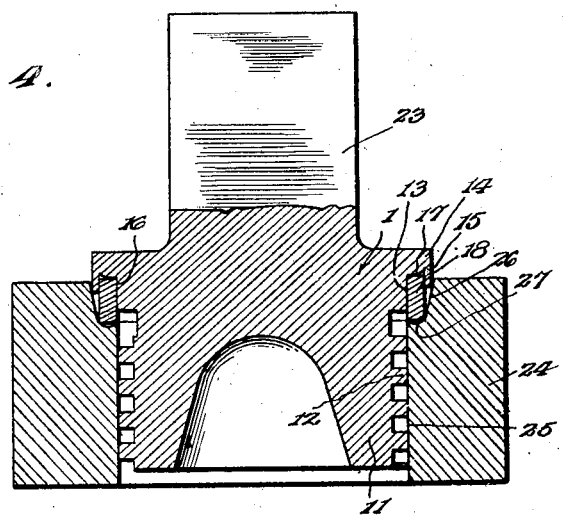
Fig. 4.
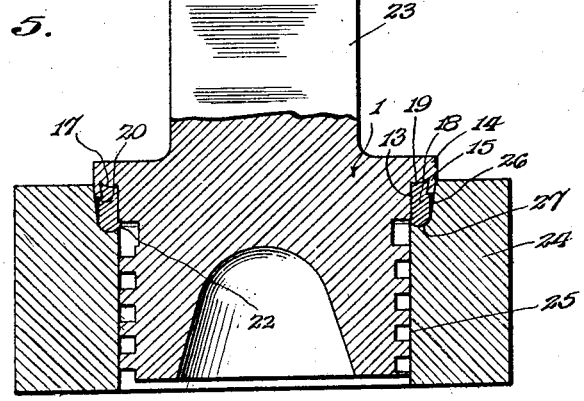
Fig. 5.
Inventor
Stanley W. Elstone.
By Lacey & Lacey, Attorneys Patented July 5, 1927.

1,634,655

UNITED STATES PATENT OFFICE.

STANLEY W. ELSTONE, OF WALKERVILLE, ONTARIO, CANADA, ASSIGNOR TO HURON MANUFACTURING CO., OF DETROIT, MICHIGAN, A CORPORATION OF MICHIGAN.

WASHOUT PLUG AND METHOD OF MAKING SAME.

Application filed January 22, 1925. Serial No. 4,109. REISSUED

This invention relates to improvements in washout plugs and while designed primarily for use in connection with locomotive and other boilers, may be employed in various other connections, and the general object of the invention is to provide a plug which will overcome certain disadvantages presented by plugs of this type in general use.

One of the requirements of a washout plug, to be efficient, is that it shall be capable of being readily removed and replaced, and shall be so constructed that when replaced there will be a reasonable degree of certainty that it will remain in place and not leak. The ordinary types of plugs are usually deficient in this respect with the result that if improperly or carelessly threaded into place, they will eventually blow out with disastrous results, or, after they have been replaced, after the operation of washing out, they will be found to leak, thereby necessitating drawing the fire from the boiler furnace to cool the boiler and thus wasting considerable time and interrupting the operation of the boiler. In view of these disadvantages presented by the ordinary plugs, it is one of the important objects of the present invention to provide a plug which may be readily removed and replaced as occasion requires and which will be of such construction that when it is replaced it must of necessity fit in a secure and fluid-tight manner so that it can neither leak nor be blown out.

In plugs of the type referred to above, various devices have been suggested for effecting a water-tight or fluid-tight seal as, for example, by the employment of gaskets of soft metal disposed between two opposing surfaces of the plug and the bushing in which the plug is seated and in some instances these gaskets have been fixed with relation to one of the two members. The use of separate gaskets presents obvious disadvantages and is not practical, and where fixed gaskets have been employed they are ordinarily seated in grooves and are flush with the surfaces in which the grooves are formed so that when they become worn, even to a slight extent, the leakage which occurs cannot be remedied except by either completely removing the gasket and replacing it with a new one, or entirely discarding the plug or the bushing upon either of which it may have been fixed. Inasmuch as it is customary to wash out a locomotive boiler after each run or trip, it will be evident that a washout plug embodying a fixed gasket, the surface of which is flush with the surface in which it is seated, is by no means a practical one as its usefulness would be of such short duration and the expense of its replacement practically prohibitive. This is particularly true where the gasket forms a part of the bushing, for in such a construction the gasket could not be conveniently resurfaced or replaced without removing the bushing from the boiler shell or wall, and this could not be done without liability of stripping the threads in the opening in the wall, thereby necessitating re-tapping of the opening and the substitution of a bushing of larger diameter. Therefore, the present invention has, as another important object to provide a washout plug embodying a fixed gasket which is carried by the plug proper and which is so united thereto and so positioned and formed as to permit of its being re-surfaced whenever occasion arises and without in any way disturbing the connection of the bushing with the boiler shell. In this connection, the invention, of course, contemplates the provision of a plug carrying a permanently fixed gasket which may be resurfaced a great number of times so that the life of the plug is greatly prolonged and replacement of the plug is only necessitated after a very long period of use.

Another object of the invention is to so form the gasket referred to above and surface of the bushing with which surface it coacts, as to insure of a perfect, fluid-tight seal between the parts, thus precluding any likelihood of leakage when the plug has been fitted into place and thereby rendering certain that after the plug has been fitted into the bushing following the washing out operation, it will be unnecessary to draw the furnace fire and permit the boiler to cool in order to readjust the plug.

Another object of the invention is to evolve a novel method of simultaneously uniting the gasket to the plug and forming the gasket to proper cross sectional contour.

In the accompanying drawings:

Figure 1 is a view in side elevation of the plug proper embodying the invention.

Figure 2 is a vertical diametric sectional view through the plug and the bushing in which it is seated, the view illustrating also the manner in which the bushing is seated in an opening in the wall of the boiler shell in connection with which the plug is employed.

Figure 3 is a horizontal sectional view taken substantially on the line 3—3 of Figure 1, looking in the direction indicated by the arrows.

Figure 4 is a view illustrating the initial step in the manufacture of the plug.

Figure 5 is a similar view illustrating the final step in the manufacture of the plug.

In order that the invention may be fully understood, I will first describe the plug in its completed form and then describe the method by which the plug is produced.

Washout plugs of the type to which this invention relates ordinarily comprise a bushing and a plug proper, and in the drawings the plug is indicated in general by the numeral 1, the bushing in general by the numeral 2, and the boiler or other shell in which the bushing is fitted, by the numeral 3. The shell 3 is formed with an opening 4 to accommodate the bushing and the wall of this opening is formed with relatively fine threads of the V-type. The bushing 2 is exteriorly formed with threads 5 of the same type and the bushing is threaded into the opening 4 and is provided preferably with a flange 6 which engages against the outer side of the shell 3. Due to the peculiar type of the threads 5, the bushing will be practically permanently secured in the opening in the boiler shell and, in fact, is intended to constitute a permanent fixture. Interiorly, the bushing 2 is formed with threads 7 of the coarse square type and the bore of the bushing at its outer end is formed to provide a gasket seat indicated in general by the numeral 8. This gasket seat is of substantially conical form, the wall of the seat or, more particularly, that portion which is of substantially true conical form, being indicated by the numeral 9, and the seat being therefore inwardly tapered. The seating surface proper is indicated by the numeral 10 and extends circumferentially about the said end of the bore of the bushing and, viewed in cross section, is of concave form and merges with the wall portion 9.

The plug 1 comprises a cylindrical body 11 having threads 12 of the coarse square type adapting the body to be threaded into the bore of the bushing 2. At the inner end of its threaded portion 12, the plug body 11 is formed to provide a smooth cylindrical portion 13 of a diameter equal to the maximum diameter of the threaded portion 12, and outwardly beyond the portion 13 the body is increased in diameter to provide a circumferential outstanding portion 14 which is formed with a flange 15 extending continuously about its periphery and providing, in conjunction with the cylindrical surface 13, a groove which is indicated by the numeral 16 and which extends continuously about the plug body. It will be observed at this point that the cylindrical surface 13 constitutes one wall, namely the inner wall, of the groove 16 and that the flange 15 constitutes the other or outer wall of the groove. It will likewise be observed that the inner wall of the groove is of greater depth than the outer wall or, in other words, that the flange 15 is of a depth less than the depth of the cylindrical portion 13. It will also be observed that the bottom wall 17 of the groove is transversely convex and that its curvature is such that the portion of the bottom wall 17 which is next adjacent the flange 15 lies deeper in the groove than does the opposite portion. The gasket is indicated by the numeral 18 and the same is of some relatively soft metal such, for example, as copper, brass, Monel metal, or the like, and the said gasket is of annular form and has its inner side or surface seating firmly about the cylindrical surface or portion of the plug body. The gasket 18 has a base portion 19 the edge of which is transversely concave to conform to the contour of the convex bottom wall 17 of the groove 16, and the flange 15 is deflected inwardly throughout its circumference, as clearly shown in Figure 2 of the drawings, and is partially embedded in the outer side of the base portion of the gasket so that in this manner the gasket is securely held at its base portion in the said groove and, at the time of manufacture of the plug, becomes substantially an integral and permanent part of the plug. The flange 15 being partially embedded in the outer side of the gasket, a shoulder 20 is formed at the side of the gasket and squarely engages against the edge of the said flange. The engaging or bearing edge of the gasket, indicated by the numeral 21, is transversely convex and of a contour to more or less snugly fit the seating portion 10 of the gasket seat 8 as shown in the said Figure 2, and, in the course of manufacture of the plug, this portion of the gasket is upset in such a manner as to provide a shoulder 22 at the inner side thereof which rests directly against that side of the portion 13 of the plug body which is presented to the threads 12, so that the engaging portion 21 of the gasket is given a firm backing or support and the union of the gasket with the plug body is rendered more secure. The plug body 11 is provided with a rectangular boss 23 for the application of a wrench whereby it may be tightened in the bushing or may be removed, or the body may be formed with a polygonal socket for the application of a socket wrench thereto. In fact, the said body may be formed in any desired manner to adapt it for the application of any particular kind of wrench.

Figures 4 and 5 of the drawings illustrate clearly the manner in which the gasket is permanently united with the plug body and it will be observed by reference to Figure 4, that the flange 15 of the plug body is initially undeflected or, in other words, is of true cylindrical form so that its outer side is co-extensive with the periphery of the enlarged portion 14 of the plug body, the groove 16 being therefore of uniform width throughout its circumference. It will also be observed by reference to this figure, that the gasket body is initially of true cylindrical form and its upper and lower edges occupy parallel planes. In setting the gasket into place and uniting the same with the plug body, I preferably make use of a die such as shown in Figures 4 and 5, and indicated by the numeral 24, and this die comprises an annular body having a bore 25 of a diameter to smoothly and yet fairly snugly receive the threaded portion 12 of the plug body, the bore at the upper side of the die being enlarged so as to provide a substantially conical forming surface 26 and a substantially concave forming surface 27, these surfaces being annular and the surface merging with the inner portion of the surface 27. The forming surface 27 is of such contour and dimensions that a chord of the arc defined thereby will be of a length equal to the thickness of the gasket body 18 in its initial form, as shown in Figure 4, and the forming surface 26 is so proportioned that the circle described by its perimeter, at the surface of the die, will be of a diameter slightly greater than the exterior diameter of the flange 15. The first step in the method of producing the plug consists in disposing the gasket 18, in its unformed condition, within the enlarged upper end of the bore 25 of the die 24 and with its lower edge resting above the forming surface 27. The plug body is then inserted downwardly through the gasket body and into the bore 25 until the upper side of the gasket body is seated in the groove 16 or, if desired, the gasket body and plug body may be first assembled and the assemblage then fitted into the die. In any event, the parts at this time will occupy the relative positions shown in Figure 4. The die 24 is supported beneath a power hammer 28 and after the plug and gasket assemblage has been disposed within the die with the boss 23 of the stud projecting upwardly toward the hammer 28, the hammer is tripped and upon impact thereof with the plug, the plug is forced downwardly in the die, resulting in the lower edge portion of the gasket body being upset by the forming surface 27 so as to form the transversely convex engaging surface 21 heretofore referred to as well as the shoulder 22, it being understood that due to the peculiar shape of the forming surface 27, the said lower edge portion of the gasket body will be crowded laterally inwardly as well as being reduced to transverse convex contour. At the same time, the upper edge portion of the gasket body will be crowded upwardly into the groove 16 in the plug body and a portion of the material of the said gasket body will enter and fill the narrow space between the inner side of the flange 15 and the adjacent side of the convex bottom wall 17 of the groove 16. Likewise, at this time, the flange 15 will be deflected continuously inwardly, due to the downward taper of the forming surface 26 of the die 24 and will be partly embedded in the outer side of the gasket body, thus forming the shoulder 20 heretofore described. In this manner, and due to the peculiar contour of the bottom wall of the groove 16, a substantially dove-tail union is effected between the base portion of the gasket body and the plug body 11, and the gasket body is, in this manner, permanently and securely united with the gasket body in such manner as to preclude either its separation or its distortion.

It will now be evident, and particularly by reference to Figure 2 of the drawings, that when the plug 1 is threaded into the bushing 2, and tightened, the convex engaging surface 21 of the gasket will bind frictionally in a fluid-tight manner against the seating surface 10 and effectually prevent any leakage. It will likewise be evident that should the gasket become slightly worn, it may be machined to restore it to its smooth condition without removing any considerable quantity of metal and, due to the fact that its engaging portion 21 projects beyond the surface of the cylindrical portion 13 an appreciable distance, this re-dressing of the bearing surface of the gasket may be repeatedly performed and the life of the plug as a whole greatly prolonged.

Having thus described the invention, what I claim is:

1. The combination with a bushing having an opening enlarged at one end to form a circumferential seat embodying a substantially inner concave portion adjacent the opening and an outer flared portion merging into the concave portion, of a plug fitted into the said bushing and having an annular enlargement and a gasket carried by the enlargement of the plug and having a portion projecting beyond the enlargement and deflected inwardly against the end thereof.

2. The combination with an internally threaded bushing having the threaded opening enlarged at one end to form a circumferential seat embodying a substantially inner concave portion adjacent the opening and an outer flared portion merging into the concave portion, of a plug threaded into the said bushing and having an annular enlargement and a gasket carried by the enlargement of the plug and having a portion projecting beyond the enlargement and deflected inwardly against the end thereof.

3. The combination with a bushing having a circumferential seat including a concave portion and a merging flared portion, and a closure for the bushing having a circumferential wall to one side of the said circumferential seat and an overhanging horizontal wall, of a packing fitted to the circular wall and having an end portion projecting to engage the concave portion of the said circumferential seat, and having the opposite end portion secured to the said horizontal wall of the closure.

4. A plug of the class described comprising a cylindrical body having a threaded portion and a circumferential groove adjacent one end of said portion, one wall of the groove being cylindrical, a gasket of annular form having a portion fitted in the groove, the inner side of the gasket snugly fitting the said wall of the groove, the other wall of the groove being deflected continuously inwardly and partially embedded in the outer side of the gasket to secure the said portion of the gasket in the groove, the engaging portion of the gasket projecting beyond the edges of the said walls of the groove whereby to provide a bearing portion which may be dressed in the event of wear.

5. A plug of the class described comprising a cylindrical body having a threaded portion and a circumferential groove adjacent one end of said portion, one wall of the groove being cylindrical, a gasket of annular form having a portion fitted in the groove, the inner side of the gasket snugly fitting the said wall of the groove, the other wall of the groove being deflected continuously inwardly and partially embedded in the outer side of the gasket to secure the said portion of the gasket in the groove, the engaging portion of the gasket projecting beyond the edges of the said walls of the groove whereby to provide a bearing portion which may be dressed in the event of wear, the said last mentioned portion of the gasket being transversely convex.

6. A plug of the class described comprising a cylindrical body having a threaded portion and a circumferential groove adjacent one end of said portion, and a gasket having a portion seating in said groove and a portion projecting exterior thereto, one wall of the groove being cylindrical, the inner side of the gasket snugly engaging said wall of the groove, the bottom of the groove being transversely convex between its said walls, the edge of the portion of the gasket which is seated in the groove being transversely concave to fit the bottom wall of the groove, the other wall of the groove being deflected inwardly and partially embedded in the outer side of the said gasket.

7. A plug of the class described comprising a cylindrical body having a threaded portion and a circumferential groove adjacent one end of said portion, and a gasket having a portion seating in said groove and a portion projecting exterior thereto, one wall of the groove being cylindrical, the inner side of the gasket snugly engaging said wall of the groove, the bottom of the groove being transversely convex between its said walls, the bottom of the said groove being lower at its side next adjacent the outer wall of the groove, the edge of the portion of the gasket which is seated in the groove being transversely concave to fit the bottom wall of the groove, the other wall of the groove being deflected inwardly and partially embedded in the outer side of the said gasket.

8. A closure plug comprising a body threaded for a portion of its length to engage a threaded circular wall and including circular enlargement, an outer extension at one end of the enlargement and a bendable wall projecting from said outer extension, and a gasket fitted to the said enlargement and projecting beyond the same at one end, and having its opposite end clamped to said enlargement by the bendable wall which is deflected inwardly.

In testimony whereof I affix my signature.

STANLEY W. ELSTONE. [L. S.]